Sept. 9, 1958 J. R. HOLLINS 2,851,673
SIGNAL LAMP SWITCH
Filed Oct. 12, 1953
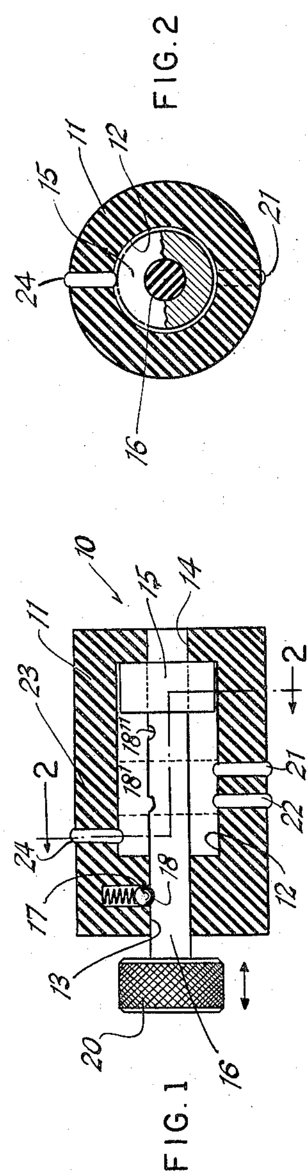
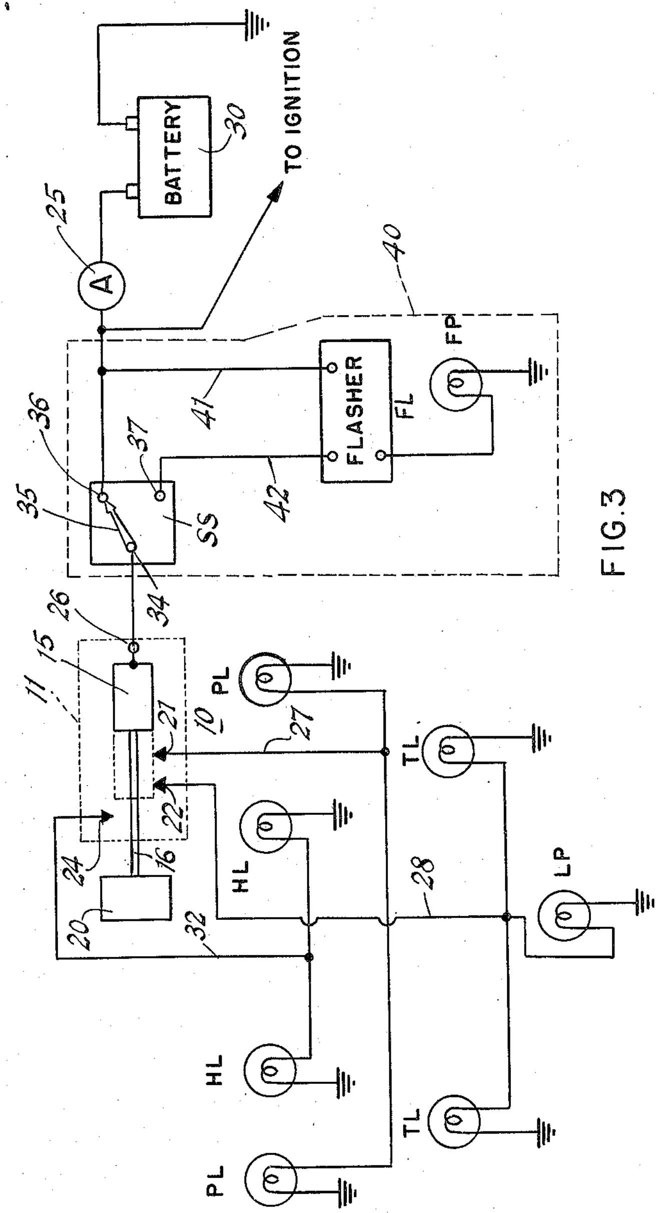
INVENTOR
BY
ATTORNEY 2,851,673

SIGNAL LAMP SWITCH

Jesse R. Hollins, Brooklyn, N. Y., assignor, by mesne assignments, to Abraham Hollins and Jesse R. Hollins, Brooklyn, Lewis S. Hollins, Great Neck, and Theodore D. Davidson, New York, N. Y.

Application October 12, 1953, Serial No. 385,399

4 Claims. (Cl. 340—81)

This invention relates to lighting and signalling systems for automotive vehicles and, more particularly, to a novel combined headlamp and emergency signal control switch.

Modern automotive vehicles are equipped with a two-position headlamp control switch, for controlling the usual front and rear mounted driving lamps, and usually with separate directional switch means for controlling twin direction signalling lamps. In one "on" position of the headlamp control switch, the tail lamps, license plate lamp or lamps, and the front mounted parking lamps are illuminated. In the other "on" position, the parking lamps are extinguished and the head lamps are illuminated.

In prior applications and patents, I have disclosed novel "flare" switch arrangements whereby signal lamps on a vehicle may be simultaneously flashed, in synchronism or in alternation, to give warning of an emergency stopping or parking of the vehicle. Such arrangements have usually been incorporated in, or wired in combination with, the directional signalling switch.

In my copending application Serial No. 381,163, filed September 21, 1953, for "Signal Lamp Switch," I have shown a novel emergency signalling arrangement wherein the "flare switch" is incorporated with the headlamp control switch in a single unit arrangement. The usual two "on" position headlamp control switch is replaced by a control switch having a "neutral" or "off" position and four "on" positions. Two "on" positions are provided on either side of the neutral position.

The two positions to one side of "neutral" provide the usual headlamp circuit connections, one being the "parking lamp" position and the other the "headlamp" position. In the first position to the other side of "neutral," all the signal lamps are flashed and the license plate lamp means is steadily illuminated. In the second "flare" position, the same occurs but the headlamps are also illuminated to provide light for tire changing, emergency repairs, etc. The flasher for the "flare" position is connected to the "live" contact of the ignition switch, or ammeter, so that the "flare" signals are operative even if the ignition switch is open.

However, many older passenger vehicles are not equipped with a turn direction signalling system, having only the more usual night driving lamps such as parking, head, tail, and stop lamps. Thus the control switch of said copending application is not readily adaptable to installation on such vehicles.

Accordingly, the present invention is directed to a novel and inexpensive emergency signalling unit arranged to be readily and easily connected between any night driving lamp control switch and the vehicle ammeter, and capable of selectively converting the usual night driving lamps into flashing emergency signal lamps.

More specifically, the invention emergency signalling unit includes a double throw selector switch and a flasher. The selector switch has a movable blade selectively engageable with either of a pair of contacts, with the flasher being connected between these contacts. In installing the unit, the headlamp switch input terminal is disconnected from the vehicle ammeter and connected to the switch blade, and one of the contacts of the selector switch is connected to the ammeter.

With the selector switch blade engaged with such one contact, the headlamp control switch is connected directly to the battery for normal operation in the usual manner. For operation of the emergency signals, the selector switch blade or arm is engaged with the other contact. This connects the headlamp switch to the ammeter through the flasher. Thus, when the headlamp switch is operated, all of the night driving lamps in circuit therewith will be flashed in synchronism, thereby providing flashing emergency signal lamps on each end of the vehicle.

For an understanding of the invention arrangement, reference is made to the following description of a typical embodiment thereof as illustrated in the accompanying drawings. In the drawings:

Fig. 1 is a longitudinal sectional view through one form of three-position headlamp switch with which the invention unit may be used;

Fig. 2 is a transverse sectional view on the line 2—2 of Fig. 1; and

Fig. 3 is a schematic wiring diagram illustrating the invention unit as incorporated in a vehicle night driving lamp system including the headlamp control switch of Figs. 1 and 2.

Referring to Figs. 1 and 2, the illustrated headlamp control switch 10 is of the three-position, "pull-out" type. This type of switch is illustrated by way of example only, as the invention is applicable to any type of headlamps control switch, including the steering column mounted type and the more common rotatable, dash-mounted knob type. This switch comprises a body 11, of dielectric material, having a longitudinal passage 12 intermediate its ends. A guide passage 13 extends through the front wall of body 11 and a central opening 14 is formed through the rear wall.

A contact bar 15 is slidably mounted in passage 12 and secured to a rod 16 extending through passage 13. A control knob 20 is secured on the outer end of dielectric rod 16. A spring pressed ball retainer 17, mounted in a recess in body 11, is arranged to engage recess 18, 18′, or 18″ in rod 16 to releasably latch the switch in any of its three positions.

Switch 10 is illustrated in the "off" position, with bar 15 at the rear of passage 12. When knob 20 is pulled to the first "on" position, shown in dotted lines, bar 15 engages parking lamps contact 21, and tail lamp contact 22. In the second "on" position, at its limit of outward movement, bar 15 disengages parking lamp contact 21 and engages head lamp contact 24 and tail lamp contact 22.

The wiring diagram for the vehicle lamps controlled by switch 10 is shown in Fig. 3. Normally, a terminal or tap 26 on switch 10, connected to bar 15, is connected directly to ammeter 25 which, in turn, is connected to the grounded vehicle battery 30. Tap 21 is connected to grounded parking lamps PL by conductor 27, and tap or contact 22 is connected to the grounded tail lamps TL and license plate lamp LP by a conductor 28. Headlamps HL are connected to tap or contact 24 by a conductor 33.

In the "off" position of switch 10, bar 15 does not engage any of the taps 21—24. In either "on" position, bar 15 engages tap 22, so that the tail lamps TL and license plate lamp LP are energized in both "on" positions. In the first "on," or "parking lamps on" position, bar 15 also engages tap 21 to energize parking lamps PL. In the second "on," or "headlamps on" position, bar 15 disengages tap 21 and engages headlamp tap 24 to illuminate the headlamps HL.

The emergency warning unit 40 of the invention is shown schematically in Fig. 3 as comprising a selector switch SS and a flasher FL. Switch SS has a movable arm 35, pivoted at a terminal 34 and arranged to selectively engage either of a pair of contacts 36, 37. Flasher FL is connected across contacts 36, 37 by conductors 41, 42.

To connect unit 40 in circuit, terminal 26 of switch 10 is disconnected from ammeter 25 and connected to terminal 34 of switch SS. Contact 36 of switch SS is then connected to ammeter 25.

With arm 35 in the position shown, engaging contact 36, headlamp switch 10 is connected directly to ammeter 25. Thus, when switch 10 is in either "on" position, the controlled lamps are steadily illuminated.

To signal an emergency stop or emergency parking, contact arm 35 is engaged with contact 37 and switch 10 moved to either "on" position. Switch 10 is then connected to ammeter 25 through flasher FL, so that the controlled lamps will be simultaneously flashed. In both "on" position, lamps TL and LP are flashed, and either lamps PL or HL are also flashed depending upon the selected "on" position of switch 10. Flasher FL, in the usual manner, has a flare pilot light FP incorporated therewith, which is flashed whenever the flasher FL is energized.

The invention unit 40, comprising selector switch SS and Flasher FL, thus provides a simple, economical, and easily installed unit, connectible between any headlamp control switch and the ammeter for converting the usual vehicle driving lamps into an emergency stop signalling or flare system.

While a specific embodiment of the invention has been described in detail to illustrate the application of the invention principles, it will be understood that the invention may be embodied otherwise without departing from such principles.

What is claimed is:

1. For use with a vehicle having parking lamps, tail lamps, license plate lamps, headlamps, and a headlamp control switch for normal steady illumination of the night driving lamps of the vehicle and having an input terminal arranged for connection to the vehicle sourec of energy, output taps respectively connectible to the vehicle parking lamps, tail lamps, license plate lamp means, and head lamps, and a movable contact selectively operable to connect the output taps to the input terminal; an emergency signalling unit arranged to be interposed between the input terminal and the vehicle source of energy and comprising, in combination, a selector switch including a movable arm selectively engageable with either of a pair of contacts; and a flasher connected between said contacts; said movable arm being connectible to the input terminal of the control switch and one of said contacts being connectible to the vehicle source of energy.

2. For use with a vehicle having parking lamps, tail lamps, license plate lamps, headlamps, and a headlamp control switch for normal steady illumination of the night driving lamps of the vehicle and having an input terminal arranged for connection to the vehicle source of energy, output taps respectively connectible to the vehicle parking lamps, tail lamps, license plate lamp means, and head lamps, and a movable contact selectively operable to connect the output taps to the input terminal; an emergency signalling unit arranged to be interposed between the input terminal and the vehicle source of energy and comprising, in combination, a selector switch including a movable arm selectively engageable with either of a pair of contacts; a flasher connected between said contacts; and a pilot lamp flashed by said flasher when the latter is energized; and said movable arm being connectible to the input terminal of the control switch and one of said contacts being connectible to the vehicle source of energy.

3. In combination with a vehicle having parking lamps, tail lamps, license plate lamps, headlamps, and a headlamp control switch for normal steady illumination of the night driving lamps of the vehicle and having an input terminal arranged for connection to the vehicle source of energy, output taps respectively connected to the vehicle parking lamps, tail lamps, license plate lamp means, and head lamps, and a movable contact selectively operable to connect the output taps to the input terminal; a selector switch having a movable arm, connected to such input terminal, and a pair of contacts selectively engageable by said movable arm, one of said contacts being connected to the vehicle source of energy; and a flasher connected between said contacts; said movable arm, when engaged with said one contact, connecting said control switch directly to the vehicle source of energy and, when engaged with the other of said contacts, connecting said control switch to the vehicle source of energy in series with said flasher.

4. In combination with a vehicle having parking lamps, tail lamps, license plate lamps, headlamps, and a headlamp control switch for normal steady illumination of the night driving lamps of the vehicle and having an input terminal arranged for connection to the vehicle source of energy, output taps respectively connected to the vehicle parking lamps, tail lamps, license plate lamp means, and head lamps, and a movable contact selectively operable to connect the output taps to the input terminal; a selector switch having a movable arm, connected to such input terminal and a pair of contacts selectively engageable by said movable arm, one of said contacts being connected to the vehicle source of energy; a flasher connected between said contacts; and a pilot lamp flashed by said flasher when the latter is energized; said movable arm, when engaged with said one contact connecting said control switch directly to the vehicle source of energy and, when engaged with the other of said contacts, connecting said control switch to the vehicle source of energy in series with said flasher.

References Cited in the file of this patent

UNITED STATES PATENTS

| | | |
|---|---|---|
| 1,812,355 | Michaels | June 30, 1931 |
| 2,171,349 | Wiley | Aug. 29, 1939 |
| 2,481,225 | Kaye | Sept. 6, 1949 |
| 2,667,602 | Flemming | Jan. 26, 1954 |